(12) United States Patent
Morrow

(10) Patent No.: US 12,147,508 B2
(45) Date of Patent: *Nov. 19, 2024

(54) SYSTEMS AND METHODS FOR SECURELY PROCESSING CONTENT

(71) Applicant: Comcast Cable Communications, LLC, Philadelphia, PA (US)

(72) Inventor: Andrew Morrow, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,989

(22) Filed: Sep. 11, 2023

(65) Prior Publication Data

US 2023/0418911 A1 Dec. 28, 2023

Related U.S. Application Data

(63) Continuation of application No. 17/811,683, filed on Jul. 11, 2022, now Pat. No. 11,790,050, which is a continuation of application No. 16/444,401, filed on Jun. 18, 2019, now Pat. No. 11,386,187.

(51) Int. Cl.
*G06F 21/10* (2013.01)
*H04L 9/08* (2006.01)
*H04L 9/32* (2006.01)

(52) U.S. Cl.
CPC ............. *G06F 21/10* (2013.01); *H04L 9/085* (2013.01); *H04L 9/3234* (2013.01); *H04L 9/3268* (2013.01); *G06F 21/107* (2023.08)

(58) Field of Classification Search
CPC ....... G06F 21/10; G06F 21/107; H04L 9/085; H04L 9/3234; H04L 9/3268
See application file for complete search history.

(56) References Cited

U.S. PATENT DOCUMENTS

| | | | |
|---|---|---|---|
| 11,386,187 B2 | 7/2022 | Morrow | |
| 2007/0183598 A1 | 8/2007 | Kim et al. | |
| 2014/0173756 A1* | 6/2014 | Chhabra | G06F 21/10 726/29 |
| 2015/0186621 A1 | 7/2015 | Uy et al. | |
| 2015/0229471 A1* | 8/2015 | Nair | H04L 9/0891 713/171 |
| 2016/0198202 A1 | 7/2016 | Van et al. | |
| 2017/0329937 A1 | 11/2017 | Choi et al. | |
| 2018/0357394 A1* | 12/2018 | Sheng | G06F 21/105 |

OTHER PUBLICATIONS

US Patent Application filed on Jun. 18, 2019, entitled "Systems and Methods for Securely Processing Content", U.S. Appl. No. 16/444,401.
US Patent Application filed on Jul. 11, 2022, entitled "Systems and Methods for Securely Processing Content", U.S. Appl. No. 17/811,683.

* cited by examiner

*Primary Examiner* — Nelson S. Giddins
(74) *Attorney, Agent, or Firm* — BakerHostetler

(57) ABSTRACT

A device may not trust another device with which it is in communication. To establish trust, a first device may send a second device an indication of signed code that is stored in a protected memory of the first device. Based on determining that the first device is a trusted device, the second device may send the first device an encrypted content asset, a decryption key associated with the content asset, and/or an encryption key associated with the content asset.

28 Claims, 6 Drawing Sheets

SYSTEMS AND METHODS FOR SECURELY PROCESSING CONTENT

CROSS-REFERENCE TO RELATED APPLICATION

This application is a continuation of U.S. patent application Ser. No. 17/811,683, filed Jul. 11, 2022, now U.S. Pat. No. 11,790,050, issued on Oct. 17, 2023, which is a continuation of U.S. patent application Ser. No. 16/444,401, filed Jun. 18, 2019, now U.S. Pat. No. 11,386,187, issued on Jul. 12, 2022, each of which is hereby incorporated by reference in its entirety.

BACKGROUND

In various systems and operations, such as content transmission or distribution, a content asset may be encrypted. Processing of the content asset may thus require decrypting the content asset. Use of an untrusted computing environment for processing of the decrypted content asset may risk unauthorized access and/or use of the decrypted content asset. Improvements are needed.

SUMMARY

Devices may be in communication with each other via a network. One or more devices may not be trusted by another device associated with the network or by a device outside the network. Systems and methods are described for establishing trust. For example, a network device comprising a protected memory storing signed code may send an indication of the code to a computing device to establish trust. Based on determining that the network device is a trusted device, the computing device may send the network device an encrypted content asset, a decryption key associated with the content asset, and/or an encryption key associated with the content asset.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
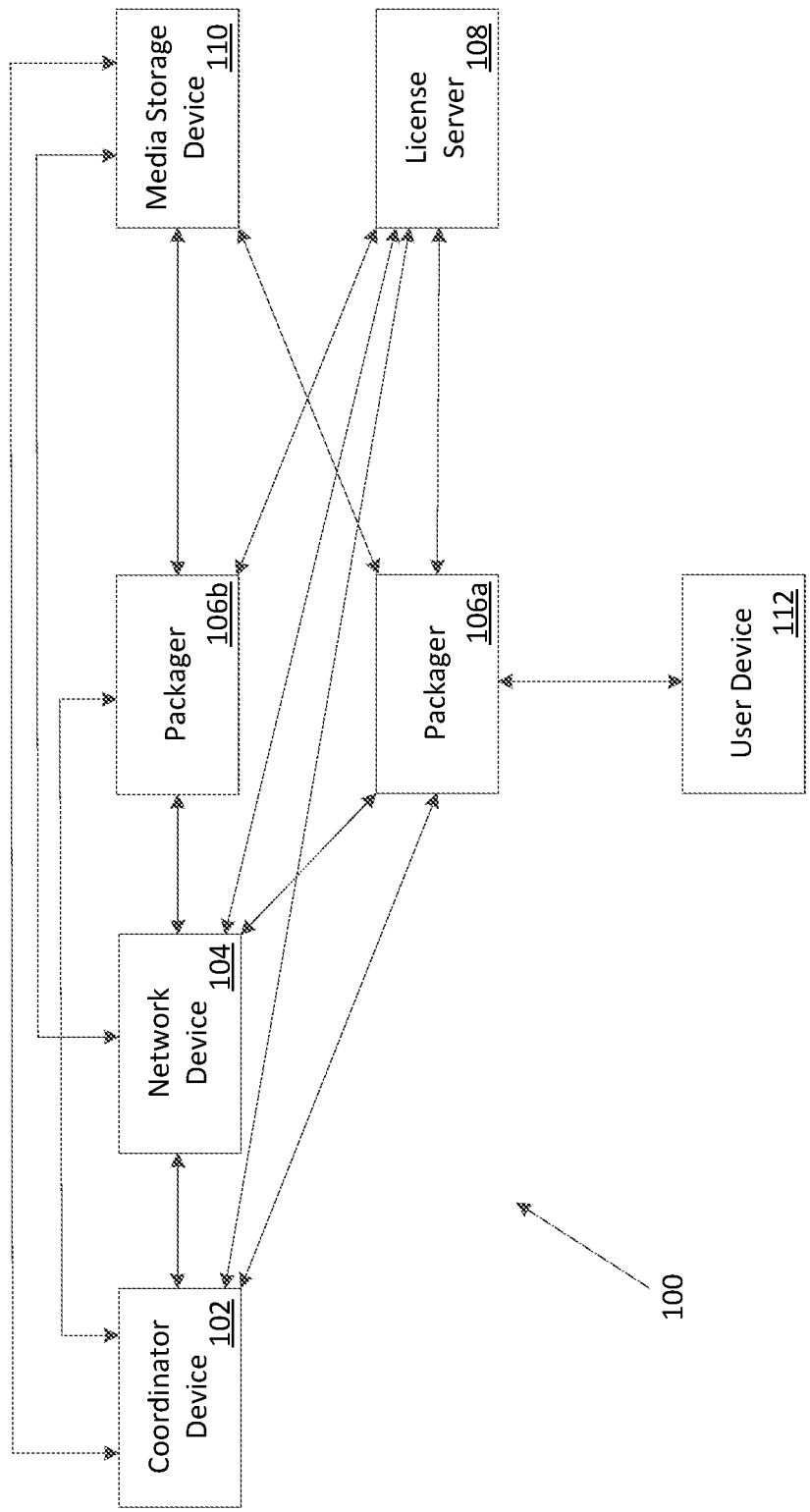
FIG. 1 shows an example system.

FIG. 1 shows an example system 100. The system 100 may comprise a network for distribution of a content asset. The content asset may comprise video content, audio content, image content, and/or other media, as examples. The content asset may be stored, such as by a content distributor and/or a content asset rights holder. The stored content asset may be secured, such as to prevent unauthorized access to the content asset. For example, the stored content asset may be secured by encryption (e.g., at-rest encryption).

The content asset distribution network may comprise a coordinator device 102, one and/or more packagers 106*a*, 106*b*, a license server 108, a media storage device 110, and/or a user device 112. The system 100 may comprise a networked computing environment. The networked computing environment may comprise a cloud computing environment, a hosting service computing environment, and/or a public server computing environment.

The networked computing environment may comprise a network device 104. The network device 104 may comprise an untrusted network device. The network device 104 may comprise a networked computing device, such as a computing device in a cloud computing network, a computing device controlled by a third party, a computing device of a hosting service (e.g., a web hosting service), and/or a public server. The network device 104 may use data, such as a decryption key, to remove the protections from the content asset. However, giving the network device 104 access to the data may risk unauthorized access to the content asset. For example, based on the network device 104 being compromised, the data stored on the network device 104 may be accessed by an unauthorized device. Using the data, the unauthorized device may decrypt and/or access the content asset. Additionally or alternatively, based on the network device 104 using the data to decrypt the content asset and the network device 104 being compromised, the unencrypted content asset stored on the network device 104 may be accessed by an unauthorized device.

A secure enclave may be installed on the network device 104. The secure enclave may comprise a secure processor and/or secure memory. The secure enclave may comprise a portion of the network device 104 whose state (e.g., registers, memory, etc.) is inaccessible (e.g., not able to be inspected, not modifiable, etc.) except to the secure enclave, once the secure enclave begins execution. The secure enclave may use software guard extensions (SGX). The SGX may comprise a set of central processing unit (CPU) instruction codes. The instruction codes may allow user-level code to allocate private regions of memory (e.g., enclaves). The private regions of memory may be protected from processes running at higher privilege levels. The secure enclave may use hardware Advanced Encryption Standard (AES) extensions. The AES extensions may provide constant-time encryption. The AES extensions may prevent side-channel attacks. The secure enclave may be protected from access and/or modification, such as by privileged code (e.g., OS, VMM, BIO, etc.).

The secure enclave may have access to a full CPU instruction set. The full CPU instruction set may comprise multi-threading and hardware encryption acceleration. Based on having access to the full CPU instruction set, the secure enclave may have minimal impact on performance of the network device 104. The network device 104 may comprise more than one secure enclaves. For example, the network device 104 may have as many secure enclaves as hardware of the network device 104 supports.

The secure enclave may be configured to compute a cryptographic measurement, such as a hash, of a state of the secure enclave. The enclave state may comprise a state of a memory of the secure enclave. The enclave state may comprise a state of one or more registers of the secure enclave. The enclave state may comprise a combination of the state of the enclave memory and the state of the enclave registers.

The cryptographic measurement may comprise a processor feature. The cryptographic measurement may be determined in a secure context. For example, the cryptographic measurement may be determined in using a method configured to prevent privileged software from interfering with and/or altering the measurement. The secure enclave may sign the measurement of the enclave state. For example, the secure enclave may use asymmetric-key cryptography to sign the measurement of the enclave state.

An external client may verify the signature. The external client may comprise a trusted device. The external client may comprise a key server. The external client may verify the signature using the enclave key issuer. The enclave key issuer may comprise a networked computer. The external client may verify the signature to prove that the measurement of the enclave state is authentic. The external client may verify the signature to prove that the measurement of the enclave state has not been tampered with.

The network device 104 may comprise an enclave service. The enclave service may comprise a program running on the network device 104. Another computing device may comprise the enclave service. The enclave service may cause signed enclave code to be loaded to the computing device. The signed enclave code may cause the partition of a portion of memory of the network device 104 as a secure memory.

A key server may comprise a computing device associated with the distributor and/or rights holder of the content asset. The key server may be configured to authenticate other computing devices, such as untrusted network devices, such as the network device 104, requesting the content asset.

The enclave service may cause a remote attestation process to occur between the network device 104 and the key server. The remote attestation process may comprise causing the network device 104 to generate a signed report. The signed report may cryptographically prove an initial state of the secure enclave. The signed report may be received by the key server. Based on the signed report, the key server may determine that the secure enclave is installed on the network device 104. Based on the signed report, the key server may determine that trusted code is running within an environment on the network device 104 that cannot be manipulated, such as by other modules on the network device 104 and/or external computing devices.

Based on determining that the secure enclave is installed on the network device 104, the key server may authenticate the network device 104. Based on authenticating the network device 104, the key server may establish a shared secret with the secure enclave, such as by performing a handshake operation. Establishing the shared secret may comprise sending a shared secret key to the network device 104. The shared secret key may be used for secure subsequent communications. The computing device may store the shared secret key to the secure enclave.

A request for the content asset may be received. The request may be received from a user device, for example. A packaging service computing device (e.g., a packager, etc.) may receive the request. The network device 104 may receive the request. The packaging service send an indication of the request to the network device 104.

Based on the request, the network device 104 may send a request for the content asset. The request may be encrypted using the shared secret key. The network device 104 may send the request for the content asset to the key server. The key server may decrypt the request. Based on the request being encrypted using the shared secret key, the key server may authenticate the network device 104. Based on the request for the content asset and/or authenticating the network device 104, the key server may send a response to the network device 104. The response may comprise a decryption key configured to decrypt the encrypted content asset. The response may comprise a digital rights management (DRM) key. The DRM key may be associated with the user device and/or recipient of the processed content asset. For example, the user device may have the DRM key and/or a key configured to decrypt a content asset that has been decrypted using the DRM key. The response may comprise the encrypted content asset. The computing device may receive the encrypted content asset from a different computing device. The response may be encrypted using the shared secret key.

The computing device may receive the response from the key server. The response may be stored to the secure enclave. The response may be decrypted. The response may be decrypted using the shared secret key. The response may be decrypted by and/or in the secure enclave. The decryption key and/or the DRM key may be determined from the response.

The computing device may receive the encrypted content asset. The computing device may store the encrypted content asset in the secure enclave. The computing device may store the encrypted content asset external to the secure enclave. The computing device may decrypt the encrypted content asset using the decryption key. The computing device may decrypt the encrypted content asset using and/or in the secure enclave. The computing device may re-encrypt the content asset, such as using the DRM key. The computing device may re-encrypt the content asset using and/or in the secure enclave. The computing device may send the re-encrypted content asset to the user device.

Using and/or storing the shared secret key, decryption key, DRM key, and/or content asset in the secure enclave may prevent unauthorized access to the content asset. Processing of the content asset using and/or in the secure enclave may prevent unauthorized access to the content asset.

A secure enclave may have limited memory and/or processing power. A large DRM-protected content asset may be processed in a secure enclave having limited memory and/or processing power by incrementally streaming the encrypted content asset from unprotected memory of the untrusted network device to the secure enclave. The encrypted content asset may be streamed in chunks. The encrypted content asset may be streamed to the secure enclave using stream ciphers, such as Advanced Encryption Standard (AES)-128. The content asset may be incrementally processed inside the secure enclave.

The content asset distribution network may send the content asset to the networked computing environment to process the content asset. Processing the content asset may comprise adding a second audio track in a second language to the content asset, re-indexing the content asset, calculating video quality metrics of the content asset, repackaging the content asset into a new container format, translating and/or adding subtitles to the content asset, transcoding the content asset, and/or re-coding the content asset, as examples. Processing the content asset may comprise removing protections from the content asset, such as by decrypting the encrypted content asset. The protections may be removed from the content asset prior to further processing of the content asset.

The coordinator device 102 may be configured to coordinate between secure and unsecure portions of the networked computing environment. The coordinator device 102 may be configured to facilitate communication between the network device 104, the one and/or more packagers 106a, 106b, the license server 108, and/or the media storage device 110. The coordinator device 102 may be configured to communicate with the network device 104, the one and/or more packagers 106a, 106b, the license server 108, and/or the media storage device 110. The coordinator device 102 may comprise one and/or more locations in memory within the networked computing environment. The coordinator device 102 may be configured to store and/or execute a system for coordination. Examples of coordination systems include Apache Zookeeper and Kubernetes, as examples. The coordinator device 102 may be configured to send an enclave provision message to the network device 104, wherein the enclave provision message may cause an enclave provision process to initiate. The enclave provision process may cause a secure enclave to be provisioned within the network device 104. The enclave provision process is described in more detail in reference to FIG. 2. A first set of one and/or more networked computing devices (e.g., cloud computing devices, servers, etc.) may comprise the coordinator device 102.

The network device 104 may comprise one and/or more locations in memory within the networked computing environment. The one and/or more locations in the memory within the networked computing environment may be configured to store and/or execute an attestation service. The attestation service may comprise the enclave key issuer. For example, a public key may be embedded in the central processing unit (CPU) of the computing device having the secure enclave, such as at the time of manufacture of the computing device and/or the CPU. A manufacturer of the CPU may store and/or maintain a registry of the public keys embedded in devices. The manufacturer of the CPU may run the attestation service to authenticate messages from enclaves on CPUs associated with the manufacturer. The key registry may be the same or may be different from the attestation service.

The one and/or more locations in the memory within the networked computing environment may be configured to store and/or execute an enclave service. The one and/or more locations in the memory within the networked computing environment may be configured to store a secure enclave. The one and/or more locations in the memory within the networked computing environment may be configured to execute code within the secure enclave.

The network device 104 may be configured to communicate with the coordinator device 102, the one and/or more packagers 106a, 106b, the license server 108, and/or the media storage device 110. The enclave service may receive the enclave provision message from the coordinator device 102. In response to the enclave provision message, the enclave provision process to provision a secure enclave (e.g., secure element, secure memory, secure processor working in coordination for protection, software guard extensions (SGX), etc.) may be initiated. The enclave provision process is described in more detail in reference to FIG. 2. A second set of one and/or more network computing devices (e.g., cloud computers, servers, etc.) may comprise the network device 104. The first set of one and/or more network computing devices may comprise the second set of one and/or more network computing devices. The first set of one and/or more network computing devices may be different from the second set of one and/or more network computing devices.

The one and/or more packagers 106a, 106b may be configured to receive a request for a content asset from a requesting user device, such as user device 112. The request for the content asset may comprise a HyperText Transfer Protocol (HTTP) request. The one and/or more packagers 106a, 106b may be configured to initiate a content delivery process in response to the request for the media. The content delivery process may comprise loading the content asset associated with the request for the content asset from the media storage device 110. The content delivery process may comprise preparing the content asset for streaming and coordinating service for streaming the content asset, as described in more detail in reference to FIG. 2. The content delivery process may comprise delivering the content asset associated with the request for the content asset to the user device 112.

The one and/or more packagers 106a, 106b may be configured to receive a request to process a content asset from a client device. The request to process the content asset may comprise a HyperText Transfer Protocol (HTTP) request. The one and/or more packagers 106a, 106b may be configured to initiate a content processing procedure in response to the request for the media. The content processing procedure may comprise loading the content asset associated with the request for the content asset from the media storage device 110. The content processing procedure may comprise processing the content asset, as described in more detail in reference to FIG. 2. The content processing procedure may comprise storing the content asset in the media storage device 110.

The one and/or more packagers 106a, 106b may be configured to communicate with the coordinator device 102, the network device 104, the license server 108, media storage device 110, and/or one and/or more user devices, such as the user device 112. A third set of one and/or more network computing devices (e.g., cloud computers, servers, etc.) may comprise the one and/or more packagers 106a, 106b. The first set of one and/or more network computing devices may comprise the third set of one and/or more network computing devices. The second set of one and/or more cloud servers may comprise the third set of one and/or more network computing devices. The first set of one and/or more network computing devices may be different from the third set of one and/or more network computing devices. The second set of one and/or more network computing devices may be different from the third set of one and/or more network computing devices.

The license server 108 may comprise a key server. The license server 108 may be configured to generate private/public key pairs. The license server 108 may comprise and/or be configured to generate shared secrets. Shared secrets may be generated using an anonymous key agreement protocol, such as Elliptic-curve Diffie-Hellman (ECDH). The license server 108 may be configured to establish a shared secret with the secure enclave. The license server 108 may comprise and/or generate digital rights management (DRM) keys. The DRM keys may be associated with content assets stored in the media storage device 110. The license server 108 may comprise and/or be configured to generate at-rest keys. The at-rest keys may be associated with content assets stored in the media storage device 110. The license server 108 may reside on one and/or more computing devices. The one and/or more computing devices may be controlled by a content distributor and/or rights holder. The license server 108 may be configured to communicate with coordinator device 102, the network device 104, and/or the one and/or more packagers 106a, 106b.

The media storage device 110 may be configured to store content assets. The content assets stored in the media storage device 110 may be protected by an access control system, such as a digital rights management (DRM) system. The content assets stored in the media storage device 110 may be protected by at-rest encryption keys. The media storage device 110 may be configured to communicate with the coordinator device 102, the network device 104, and/or the one and/or more packagers 106a, 106b. A fourth set of one and/or more network computing devices (e.g., cloud computers, servers, etc.) may comprise the media storage device 110. The first set of one and/or more network computing devices may comprise the fourth set of one and/or more network computing devices. The second set of one and/or more network computing devices may comprise the fourth set of one and/or more network computing devices. The third set of one and/or more network computing devices may comprise the fourth set of one and/or more network computing devices. The first set of one and/or more network computing devices may be different from the fourth set of one and/or more network computing devices. The second set of one and/or more network computing devices may be different from the fourth set of one and/or more network computing devices. The third set of one and/or more network computing devices may be different from the fourth set of one and/or more network computing devices.

The user device 112 may comprise a smart phone, tablet, wearable computing device, laptop, desktop, television, set-top box, cable modem, router, Wi-Fi access point, and/or any device configured to receive and/or present media streamed from the content asset distribution network. The user device 112 may be configured to communicate with the one and/or more packagers 106a, 106b. The user device 112 may be configured to send a request for media to one of the one and/or more packagers 106a, 106b. The request for media may comprise a HyperText Transfer Protocol (HTTP) request.

Figure 2:
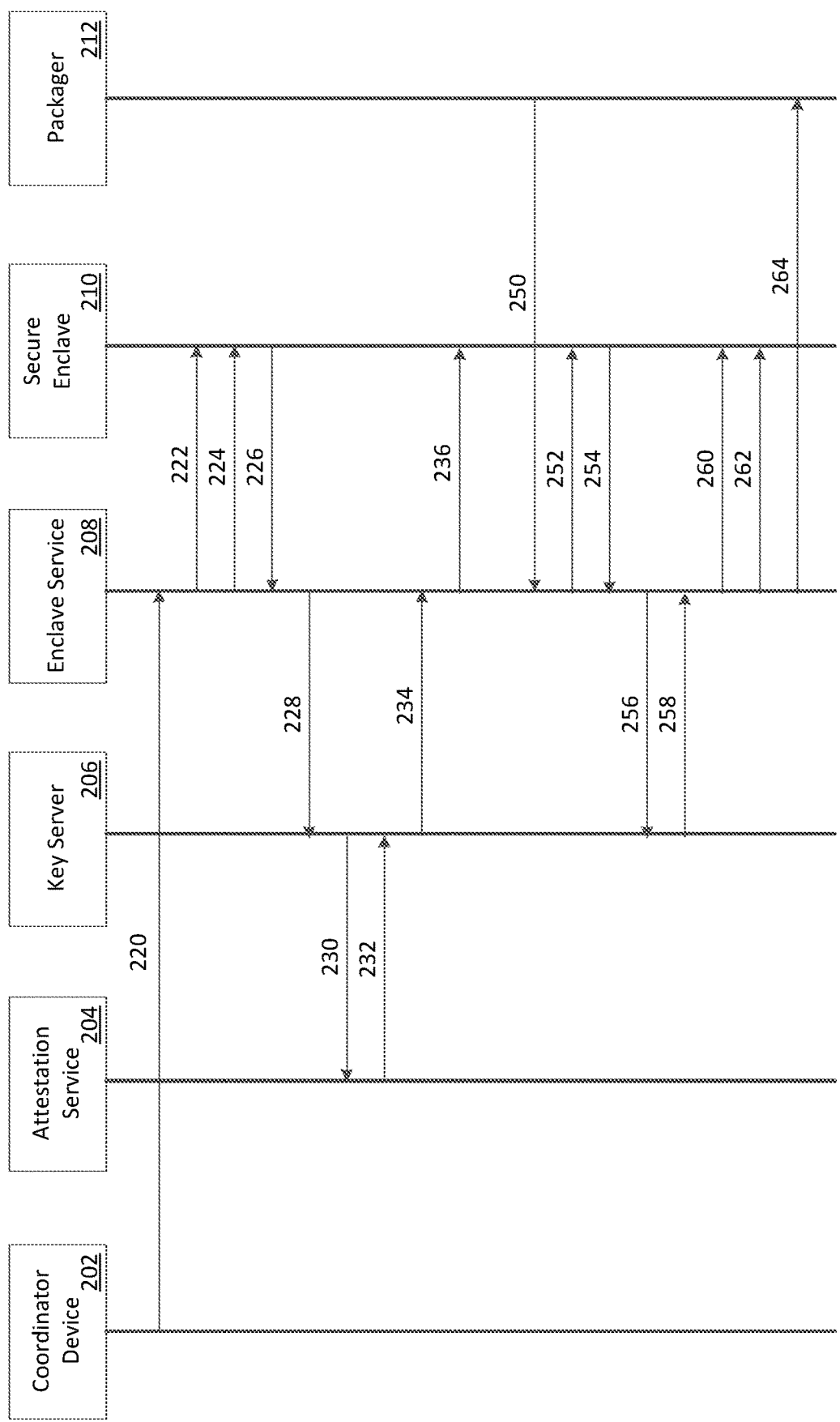
FIG. 2 shows an example method.

FIG. 2 shows an example method. The devices performing the method may comprise a coordinator device 202, an attestation service 204, a key server 206, an enclave service, an enclave 210, and/or a packager 212. The coordinator device 202 may comprise and/or be similar to the coordinator device 102 in FIG. 1. The coordinator device 202 may initiate an enclave provision process, which is described below at 222-236. The attestation service 204 may in the network device 104 in FIG. 1 and/or in a computing device similar to the network device 104 in FIG. 1. The key server 206 may comprise and/or be similar to the license server 108 in FIG. 1. The key server 206 may be associated with a content distributor and/or rights holder. The enclave service 208 may in the network device 104 in FIG. 1 and/or in a computing device similar to the network device 104 in FIG. 1. The secure enclave 210 may in the network device 104 in FIG. 1 and/or in a computing device similar to the network device 104 in FIG. 1. The packager 212 may in the network device 104 in FIG. 1 and/or in a computing device similar to the network device 104 in FIG. 1.

The attestation service 204, the enclave service 208, the secure enclave 210, and/or the packager 212 may be on a same computing device within a network computing environment (e.g., cloud computing environment, hosting service computing environment, public server computing environment, etc.). The attestation service 204, the enclave service 208, the secure enclave 210, and/or the packager 212 may be on different computing devices within a cloud computing environment. The computing device(s) comprising the attestation service 204, the enclave service 208, the secure enclave 210, and/or the packager 212 may be untrusted by the key server 206 and/or the content distributor associated with the key server 206.

At step 220, the coordinator device 202 may send a first signal to the enclave service 208. The first signal may comprise one and/or more indications of a command to provision a secure enclave. At step 222, the enclave service 208 may cause enclave code, such as binary code, to be loaded into the secure enclave 210. The enclave service 208 may cause the enclave code to be loaded into the secure enclave 210 in response to receiving the first signal. The enclave service 208 may cause one and/or more locations in memory within the cloud computing environment to be designated as the secure enclave 210. The enclave code may be associated with the key server 206 and/or the content distributor associated with the key server 206. The enclave code may be trusted by the key server 206 and/or the content distributor associated with the key server 206. The enclave code may comprise a signature associated with the key server 206 and/or the content distributor associated with the key server 206. The signature may be associated with a hardcoded public key.

At step 224, the enclave service 208 may send a second signal to the secure enclave 210. The second signal may comprise one and/or more indications of a command to initiate remote attestation.

At step 226, in response to receiving the second signal, the secure enclave 210 may generate a third signal. The secure enclave 210 may generate the third signal in response to receiving the second signal. The third signal may comprise a remote attestation message with Elliptic-curve Diffie-Hellman (ECDH) context. The third signal may comprise a cryptographic measurement of the secure enclave 201. The third signal may comprise a cryptographic measurement of a state of the secure enclave 201, such as of a memory or a register of the secure enclave 201. The cryptographic measurement may comprise a hash of the secure enclave 210. The hash may be signed.

The third signal may be signed using the enclave's unique private key. The third signal may comprise an initiation message. The initiation message may be configured for a cryptographic "handshake." The cryptographic handshake may establish secure communication between the enclave and an external service. The handshake may comprise an ECDH context. The handshake may comprise asymmetric public key. The secure enclave may forward the third signal to the enclave service 208.

At step 228, the enclave service 208 may forward the third signal to the key server 206. At step 230, in response to receiving the third signal, the key server 206 may generate a fourth signal. The key server 206 may generate the fourth signal in response to receiving the third signal. The fourth signal may comprise one and/or more indications of a command to validate the attestation message contained in the third signal.

The key server 206 may forward the fourth signal to the attestation service 204. The attestation service may comprise the enclave key issuer. For example, a public key may be embedded in the central processing unit (CPU) of the computing device having the secure enclave, such as at the time of manufacture of the computing device and/or the CPU. A manufacturer of the CPU may store and/or maintain a registry of the public keys embedded in devices. The manufacturer of the CPU may run the attestation service to authenticate messages from enclaves on CPUs associated with the manufacturer. The key registry may be the same or may be different from the attestation service.

At step 232, the attestation service 204 may validate the attestation message. The attestation service 204 may validate the attestation message in response to receiving the fourth signal. The attestation service 204 may generate a fifth signal. The fifth signal may comprise a signature. The fifth message may comprise one and/or more indications that the attestation message was validated. The attestation service 204 may send the fifth signal to the key server 206.

At step 234, the key server 206 may validate the enclave code. The key server 206 may validate the enclave code based on the third signal and the fifth signal. The key server 206 may validate the enclave code in response to receiving the fifth signal. The key server 206 may generate a sixth signal. The sixth signal may comprise a signature. The sixth signal may comprise one and/or more indications that the enclave code was validated. The sixth signal may comprise an ECDH response. The key server 206 may send the sixth signal to the enclave service 208.

At step 236, the enclave service 208 may forward the sixth signal to the secure enclave 210. In response to the sixth signal, the key server 206 and the secure enclave 210 may exchange a shared secret. The secure enclave 210 may be initialized and ready for a request. An example request may be shown at steps 250-264.

At step 250, the packager 212 may send a seventh signal to the enclave service 208. The packager 212 may be untrusted by the key server 206 and/or the content distributor associated with the key server 206. The seventh signal may comprise one and/or more indications of a command to prepare a content asset and/or a media segment associated with a content asset. The seventh signal may be generated in response to a HyperText Transfer Protocol (HTTP) request received at the packager 212 from a user device. The HTTP request may be associated with the content asset and/or the media segment associated with the content asset. The seventh signal may be generated in response to a command to alter the content asset and/or the media segment associated with the content asset (e.g., add a second language audio track to the content asset and/or the media segment associated with the content asset comprising an audio track in a first language, re-indexing the content asset and/or the media segment associated with the content asset, re-coding the content asset and/or the media segment associated with the content asset, etc.). The packager 212 may send the seventh signal to the enclave service 208.

In response to the seventh signal, the enclave service 208 may cause the content asset and/or the media segment associated with the content asset to be loaded into memory (preprocessing memory). In response to the seventh signal, the enclave service 208 may prepare an area in memory to save a result of processing the content asset and/or the media segment associated with the content asset (post-processing memory).

At step 252, the enclave service 208 may generate an eighth signal. The eighth signal may comprise one and/or more indications of a command to prepare a key request for the content asset and/or the media segment associated with the content asset. The key request may comprise a content identifier (ID) associated with the content asset of the media segment of the content asset. The key request may comprise metadata associated with the content asset of the media segment of the content asset. The enclave service 208 may forward the eighth signal to the secure enclave 210.

At step 254, the secure enclave 210 may generate a ninth signal. The secure enclave 210 may generate the ninth signal in response to receiving the eighth signal. The ninth signal may comprise one and/or more indications of a request for one and/or more keys. The one and/or more keys may comprise one and/or more at-rest keys. The one and/or more keys may comprise one and/or more digital rights management (DRM) keys. The ninth signal may be encrypted using the shared secret. The secure enclave 210 may send the ninth signal to the enclave service 208.

At step 256, the enclave service 208 may forward the ninth signal to the key server 206. At step 258, the key server 206 may decrypt the ninth signal. The ninth signal may be decrypted using the shared secret. The key server 206 may validate the request for one and/or more keys. The request for the one and/or more keys may be extracted from the ninth signal. The one and/or more requested keys may be retrieved. The one and/or more requested keys may comprise one and/or more at-rest keys. The one and/or more requested keys may comprise one and/or more DRM keys. The one and/or more requested keys may be associated with the content asset and/or the media segment associated with the content asset.

The key server 206 may prepare a tenth signal. The tenth signal may comprise one and/or more of the one and/or more requested keys. The key server 206 may use the shared secret to encrypt the tenth signal. The key server 206 may send the tenth signal to the enclave service 208.

At step 260, the enclave service 208 may forward the tenth signal to the secure enclave 210. In response to the receiving the tenth signal, the secure enclave 210 may decrypt the tenth signal. The tenth signal may be decrypted using the shared secret. The secure enclave 210 may extract the one and/or more of the one and/or more requested keys from the tenth signal (one and/or more extracted keys). The secure enclave may cache the one and/or more extracted keys.

At step 262, the secure enclave 210 may pull the content asset and/or the media segment associated with the content asset (streamed media) from the preprocessing memory. The enclave service 208 may stream the content asset and/or the media segment associated with the content asset (streamed media) from the preprocessing memory to the secure enclave 210. The secure enclave 210 may load metadata associated with the streamed media into privileged memory. The metadata may comprise an International Organization for Standardization (ISO) base media file format (BMFF) initialization segment. The secure enclave 210 may load the streamed media into the privileged memory. The secure enclave 210 may load the streamed media into the privileged memory in small chunks. The secure enclave 210 may use the one and/or more cached keys to decrypt the streamed media. The secure enclave 210 may process the streamed media in accordance with the command to prepare the content asset and/or the media segment associated with the content asset (processed media). The secure enclave 210 may use one and/or more of the one and/or more cached keys to encrypt the processed media. The secure enclave 210 may use a DRM key to encrypt the processed media (encrypted media). The secure enclave 210 may stream the encrypted media to the post-processing memory (packaged media). The secure enclave 210 may stream the packaged media to the post-processing memory in small chunks.

At step 264, the enclave service 208 may stream the packaged media from the post-processing memory to the packager 212. The packager 212 may deliver the packaged media to the user device. The user device may retrieve DRM keys via another process. The packager 212 may cause the packaged media to be stored in a media storage device.

Figure 3:
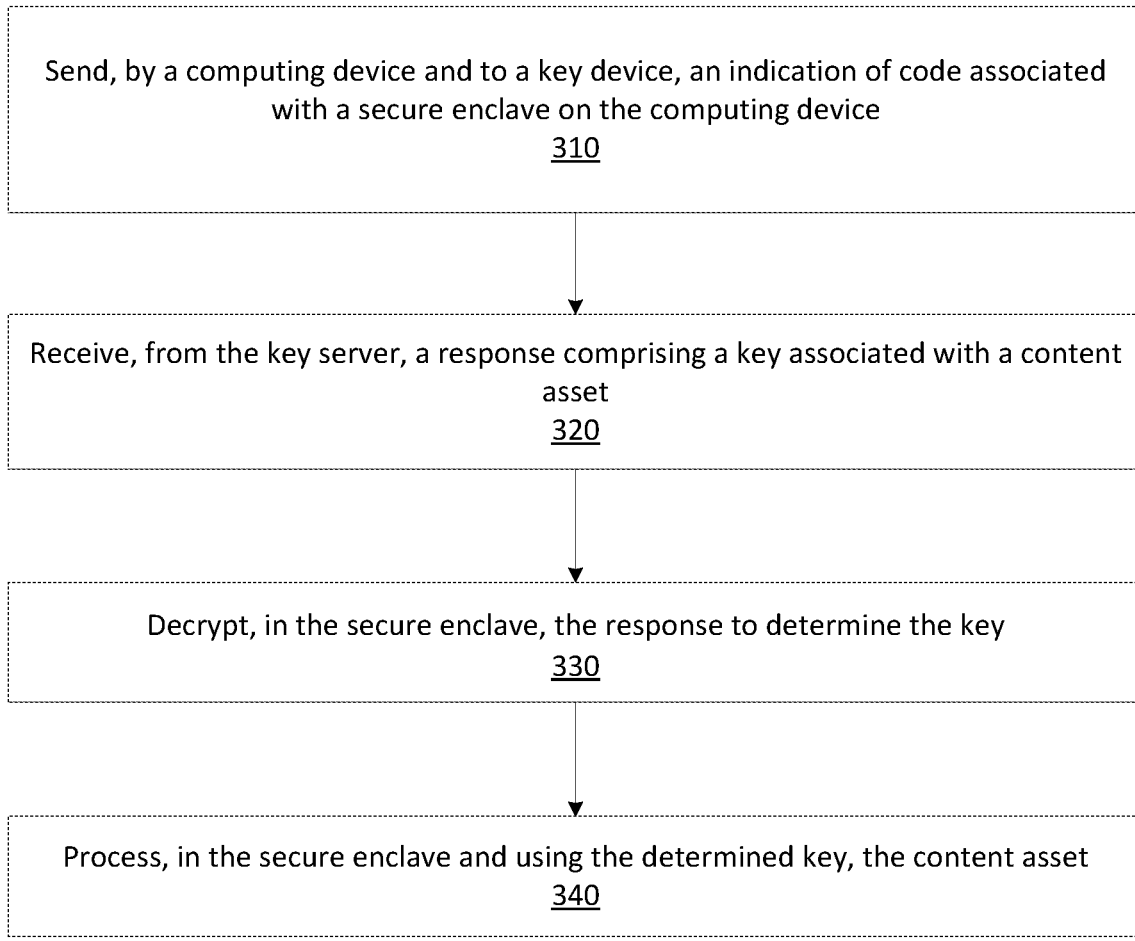
FIG. 3 shows an example method.

FIG. 3 shows an example method. At step 310, an indication of code associated with a secure enclave on a network device may be sent. The indication of the code may be sent to a key device. The indication of the code may be sent by the network device. The network device 104 in FIG. 1 may send an indication of code associated with a secure enclave on the network device 104 to the license server 108 in FIG. 1. The secure enclave may comprise a signed code module in a protected memory of the network device. A shared secret key may be received from the key device. The shared secret key may be received in response to sending the indication of the code associated with the secure enclave by the network device to the key device. A shared secret key may be received from the key device and in response to the sending the indication of the code. The network device 104 in FIG. 1 may receive a shared secret key from the license server 108 in FIG. 1 and in response to the sending the indication of the code. The indication may comprise a digital certificate associated with the network device.

The key device may comprise a key server. The network device may be untrusted by the key server. The key server may comprise a device associated with at least one of a content asset distributor, a digital services provider, and/or a content creator. The secure enclave may comprise an Intel Software Guard Extension (SGX) enclave. The indication of the code associated with the secure enclave may comprise an indication of an initial state of the signed code module. The indication of the initial state of the signed code module may comprise an indication of at least one of a state of a register of the secure enclave and/or a state of the protected memory. The indication of the code associated with the secure enclave may be encrypted with a key associated with the key server.

The key server may determine that the network device is a trusted device by sending the indication of the code to an authentication device. The authentication device may determine, based on the indication of the code, that the secure enclave comprises a secure environment. The key server may send the shared secret key by initiating a handshake protocol with the network device. The shared secret key may comprise a pair of cryptographic keys. The shared secret key may comprise a pair of asymmetric keys. The network device may comprise a cloud computing device. The key server and the network device may be associated with different users. The network device may send the indication of the code associated with the secure enclave based on the signed code module being loaded in the protected memory. The network device may store the shared secret key in the secure enclave.

At step 320, a response comprising a key associated with a content asset may be received. The response may be received from the key device. The network device 104 in FIG. 1 may receive the response. The response may comprise a key associated with a content asset from the license server 108 in FIG. 1. A request for the key associated with the content asset may be sent to the key device. The network device 104 in FIG. 1 may send a request for the key associated with the content asset to the license server 108 in FIG. 1. The request may be encrypted using the shared secret key. The key may comprise a decryption key. The key may comprise a digital rights management (DRM) key. The DRM key may be associated with a user device. A request for a DRM key may be sent based on receiving a request for the content asset.

The request for the DRM key associated with the content asset may be sent to the key server. The network device 104 in FIG. 1 may send the request for the DRM key associated with the content asset to the license server 108 in FIG. 1. The request may be encrypted using the shared secret key. An encrypted response to the request may be received from the key server. The network device 104 in FIG. 1 may receive an encrypted response to the request from the license server 108 in FIG. 1. The encrypted response may comprise the DRM key and a decryption key. The sending the request for the DRM key may be based on receiving a request for the content asset. The request may comprise a digital certificate associated with the network device.

The request for the DRM key may comprise an indication of the content asset. The DRM key may be associated with a user device. The request for the DRM key may comprise an indication of the user device. The request for the DRM key may comprise a digital certificate associated with the network device. The key server may send an encrypted response to the request based on the request being encrypted with the shared secret key.

The network device may receive the content asset. The network device may receive the content asset from a content distribution server. The network device may store the content asset external to the secure enclave. The network device may store the content asset in an unprivileged memory on the network device. The network device may transfer a portion of the content asset to the secure enclave.

At step 330, the response may be decrypted to determine the key in the secure enclave. The network device 104 in FIG. 1 may decrypt the response in the secure enclave to determine the key. The encrypted response may be decrypted in the secure enclave and using the shared secret key to determine the DRM key and the decryption key. The network device 104 in FIG. 1 may decrypt the encrypted response in the secure enclave to determine the DRM key and the decryption key using the shared secret key.

At step 340, the content asset may be processed. The content asset may be processed in the secure enclave. The content asset may be processed using the determined key. The network device 104 in FIG. 1 may process the content asset. The processing the content asset may comprise at least one of encrypting and/or decrypting the content asset in the secure enclave. The processing the content asset may comprise decrypting, in the secure enclave and using the decryption key, the content asset. The processing the content asset may comprise encrypting, in the secure enclave and using the DRM key, the content asset. The content asset may be sent to the user device. The network device 104 in FIG. 1 may send the content asset to the user device 112 in FIG. 1. The content asset may be stored in an encrypted form. The network device 104 in FIG. 1 may store the content asset in an encrypted form in the media storage device 110 in FIG. 1. The content asset may be sent in an encrypted form to a user device. The network device 104 in FIG. 1 may send the content asset in an encrypted form to the user device 112 in FIG. 1.

A first portion of the content asset may be stored in the secure enclave. The network device 104 in FIG. 1 may store a first portion of the content asset in the secure enclave. The first portion of the content asset may be decrypted. The network device 104 in FIG. 1 may decrypt the first portion of the content asset. The first portion of the content asset may be encrypted using the key. The network device 104 in FIG. 1 may encrypt the first portion of the content asset using the key. The encrypted first portion of the content asset may be sent to a user device. The network device 104 in FIG. 1 may send the encrypted first portion of the content asset to the user device 112 in FIG. 1.

A second portion of the content asset may be stored in the secure enclave. The second portion of the content asset may be stored in the secure enclave after the sending the encrypted first portion of the content asset to the user device. The network device 104 in FIG. 1 may store the second portion of the content asset in the secure enclave. The network device 104 in FIG. 1 may store the second portion of the content asset in the secure enclave after the sending the encrypted first portion of the content asset to the user device 112 in FIG. 1. The second portion of the content asset may be decrypted. The network device 104 in FIG. 1 may decrypt the second portion of the content asset. The second portion of the content asset may be encrypted using the key. The network device 104 in FIG. 1 may encrypt the second portion of the content asset using the key. The encrypted second portion of the content asset may be sent to the user device. The network device 104 in FIG. 1 may send the encrypted second portion of the content asset to the user device 112 in FIG. 1.

The decrypting the first portion of content asset may comprise, after at least one of sending and/or storing the first portion external to the secure enclave, storing a second portion of the content asset in the secure enclave. After at least one of sending and/or storing the first portion external to the secure enclave, the network device 104 in FIG. 1 may store the second portion of the content asset in the secure enclave. The decrypting the first portion of content asset may comprise decrypting the second portion of the content asset. The network device 104 in FIG. 1 may decrypt the second portion of the content asset. The at least one of sending and/or storing the first portion external to the secure enclave may comprise at least one of sending and/or storing the first portion an unprivileged memory on the network device.

The content asset may be modified. The network device 104 in FIG. 1 may modify the content asset. The processing the content asset may comprise encrypting the modified content asset. The network device 104 in FIG. 1 may encrypt the modified content asset.

The content asset may be decrypted in the secure enclave. The content asset may be decrypted using the decryption key. The network device 104 in FIG. 1 may decrypt the content asset. The content asset may be encrypted in the secure enclave. The content asset may be encrypted using the DRM key. The network device 104 in FIG. 1 may encrypt the content asset in the secure enclave and using the DRM key.

The encrypted content asset may be stored. The network device 104 in FIG. 1 may store the encrypted content asset in the media storage device 110 in FIG. 1. The encrypted content asset may be sent to a user device. The network device 104 in FIG. 1 may send the encrypted content asset to the user device 112 in FIG. 1. The sending the request for the DRM key may be based on a request, associated with the user device, for the content asset.

The decrypting the content asset may comprise storing a first portion of the content asset in the secure enclave. The decrypting the content asset may comprise decrypting the first portion of the content asset. The encrypting the content asset may comprise encrypting the first portion of the content asset.

The decrypting the content asset may comprise storing a first portion of the content asset in the secure enclave. The decrypting the content asset may comprise decrypting, using the decryption key, the first portion of the content asset. The encrypting the content asset may comprise encrypting, using the DRM key, the first portion of the content asset. The encrypted first portion of the content asset may be sent to a user device. The network device 104 in FIG. 1 may send the encrypted first portion of the content asset to the user device 112 in FIG. 1.

A second portion of the content asset may be stored in the secure enclave. The second portion of the content asset may be stored in the secure enclave after the sending the encrypted first portion of the content asset to the user device. After the sending the encrypted first portion of the content asset to the user device 112 in FIG. 1, the network device 104 in FIG. 1 may store a second portion of the content asset in the secure enclave. The second portion of the content asset may be decrypted using the decryption key. The network device 104 in FIG. 1 may decrypt the second portion of the content asset using the decryption key. The second portion of the content asset may be encrypted using the DRM key. The network device 104 in FIG. 1 may encrypt the second portion of the content asset using the DRM key. The encrypted second portion of the content asset may be sent to the user device. The network device 104 in FIG. 1 may send the encrypted second portion of the content asset to the user device 112 in FIG. 1.

The decrypting the content asset may comprise and/or storing a second portion of the content asset in the secure enclave. The decrypting the content asset may comprise storing the second portion of the content asset in the secure enclave after at least one of sending and/or storing the first portion external to the secure enclave. The decrypting the content asset may comprise decrypting the second portion of the content asset. The at least one of sending and/or storing the first portion external to the secure enclave may comprise at least one of sending and/or storing the first portion an unprivileged memory on the network device.

The content asset may be modified. The network device 104 in FIG. 1 may modify the content asset. The at least one of decrypting and/or encrypting the content asset may comprise encrypting the modified content asset. The modifying the content asset may comprise at least one of re-transcribing, re-packaging, augmenting, transcoding, adding secondary content, re-indexing, re-coding, and/or re-formatting at least a portion of the content asset.

The DRM key may be associated with a user device. A key configured to decrypt data encrypted using the DRM key may be stored to the user device. The decryption key may be unique to the content asset.

The network device may decrypt, using the decryption key and in the secure enclave, the portion of the content asset. The network device may encrypt, using the DRM key and in the secure enclave, the portion of the content asset. The network device may send, to a user device, the encrypted portion of the content asset before transferring another portion of the content asset to the secure enclave. The network device may send, to a user device, the encrypted content asset. The user device may comprise at least one of a mobile phone, a set-top box, a laptop, a tablet, and/or an internet of things (IoT) device. The network device may send the encrypted content asset by streaming, to the user device, the encrypted content asset.

The network device may modify the content asset. The network device may encrypt the content asset by encrypting the modified content asset. The network device may modify the content asset by at least one of re-transcribing, re-packaging, augmenting, transcoding, adding secondary content, re-indexing, re-coding, and/or re-formatting at least a portion of the content asset.

A content distributor may comprise a content distribution network. The content distribution network may comprise a media storage device. The media storage device may comprise a content asset. The content asset may comprise an audio component. The audio component may comprise a first language, such as English. An owner of the content asset may wish to add a second audio component to the content asset. The second audio component may comprise a second language, such as Spanish.

The owner of the content asset may send a command to add the second audio component to the content asset to a network device associated with the owner of the content asset. The network device may be untrusted by the content distributor. The network device may comprise a secure enclave. The secure enclave may comprise enclave code. On verifying the enclave code, a key server associated with the content distributor may send keys needed to add the second audio component to the content asset to the network device.

The network device may use the keys to decrypt the content asset in the secure enclave. The network device may add the second component to the content asset in the secure enclave to generate a new version of the content asset. The network device may use the keys to encrypt the new version of the content asset in the secure enclave. The network device may send the new version of the content asset to the media storage device.

Figure 4:
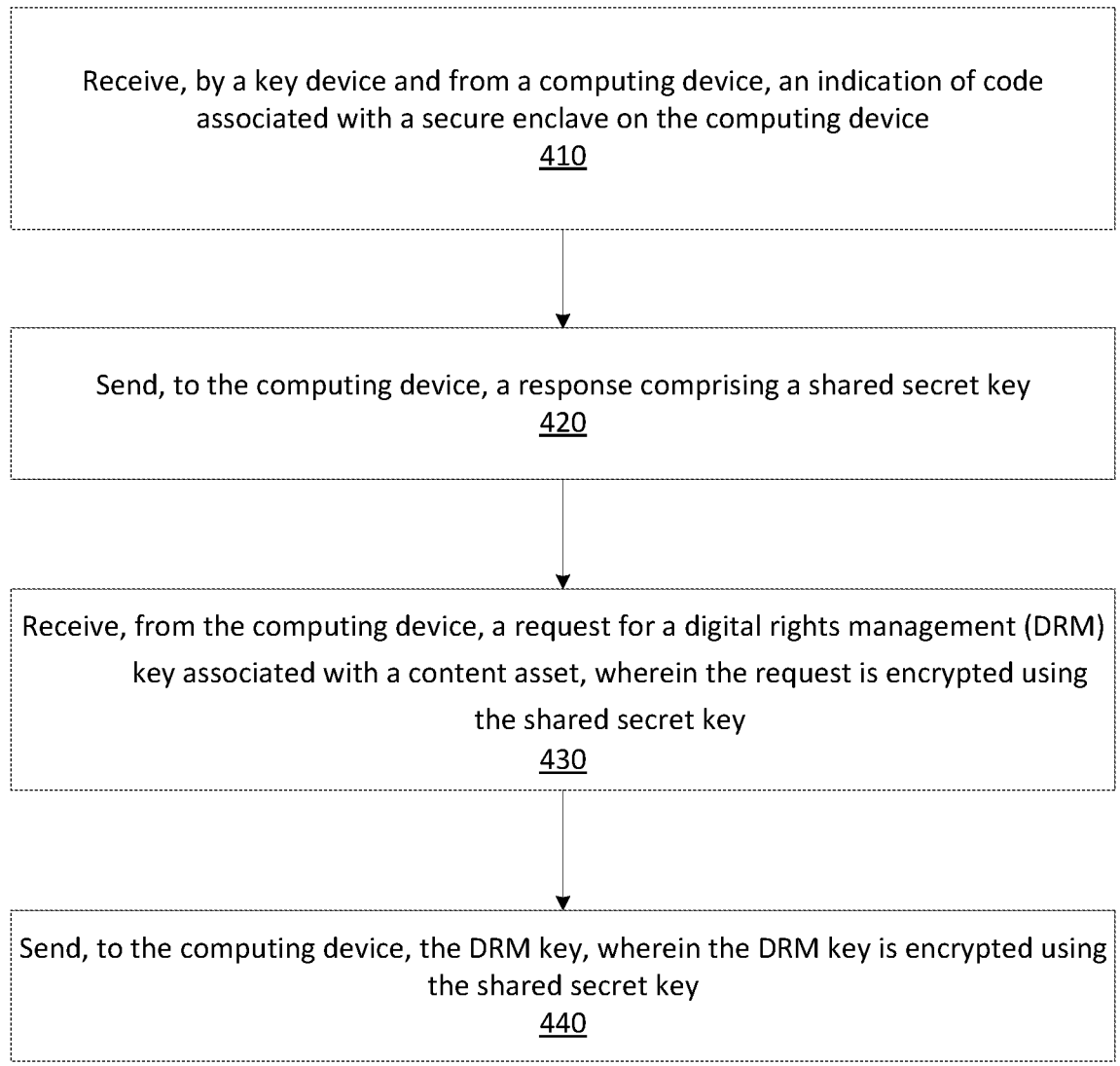
FIG. 4 shows an example method.

FIG. 4 shows an example method. At step 410, an indication of code associated with a secure enclave on a network device may be received. The indication of the code may be received by a key device. The indication of the code may be received from the network device. The license server 108 in FIG. 1 may receive the indication of code associated with a secure enclave on the network device 104 in FIG. 1 by the license server 108 and from the network device 104. The secure enclave may comprise a signed code module in a protected memory of the network device. The signed code module may be configured to cause the network device to at least one of decrypt and/or encrypt the content asset in the secure enclave. The key device may comprise a key server. The network device may be untrusted by the key server.

A determination may be made that the network device is a trusted device. The determination that the network device is a trusted device may be based on the indication of the code. The license server 108 in FIG. 1 may determine that the network device 104 in FIG. 1 is a trusted device based on the indication of the code. The key server may comprise a device associated with at least one of a content asset distributor, a digital services provider, and/or a content creator. The secure enclave may comprise an Intel Software Guard Extension (SGX) enclave. The indication of the code associated with the secure enclave may comprise an indication of an initial state of the signed code module. The indication of the initial state of the signed code module may comprise an indication of at least one of a state of a register of the secure enclave and/or a state of the protected memory. The indication of the code associated with the secure enclave may be encrypted with a key associated with the key server.

The key server may determine that the network device is a trusted device by sending the indication of the code to an authentication device. The authentication device may determine, based on the indication of the code, that the secure enclave comprises a secure environment. The network device may comprise a cloud computing device. The key server and the network device may be associated with different users. The network device may send the indication of the code associated with the secure enclave based on the signed code module being loaded in the protected memory. The network device may store the shared secret key in the secure enclave.

At step 420, a response comprising a shared secret key may be sent to the network device based on the indication of the code. The license server 108 in FIG. 1 may send a response comprising a shared secret key to the network device 104 in FIG. 1 based on the indication of the code. The shared secret key may be sent to the network device based on determining that the network device is a trusted device. The license server 108 in FIG. 1 may send the shared secret key to the network device 104 in FIG. 1 based on determining that the network device 104 is a trusted device.

The key server may send the shared secret key by initiating a handshake protocol with the network device. The shared secret key may comprise a pair of cryptographic keys. The shared secret key may comprise a pair of asymmetric keys.

At step 430, a request for a digital rights management (DRM) key associated with a content asset may be received. The request may be received from the network device. The license server 108 in FIG. 1 may receive a request for a digital rights management (DRM) key associated with a content asset from the network device 104 in FIG. 1. The request may be encrypted using the shared secret key. The request may comprise a digital certificate associated with the network device. The request for the DRM key may be an encrypted request.

The signed code module may cause the network device to at least one of encrypt and/or decrypt the content asset in the secure enclave. The encrypted request may comprise a digital certificate associated with the network device. An indication of the digital certificate may be stored in a database of trusted devices. The license server 108 in FIG. 1 may store an indication of the digital certificate in a database of trusted devices.

The request for the DRM key may comprise an indication of the content asset. The DRM key may be associated with a user device. The request for the DRM key may comprise an indication of the user device. The request may comprise a digital certificate associated with the network device. The key server may send an encrypted response to the request based on the request being encrypted with the shared secret key. The DRM key may be associated with a user device. A key configured to decrypt data encrypted using the DRM key may be stored to the user device.

The network device may receive the content asset. The network device may receive the content asset from a content distribution server. The network device may store the content asset external to the secure enclave. The network device may store the content asset in an unprivileged memory on the network device. The network device may transfer a portion of the content asset to the secure enclave. The network device may decrypt, using the decryption key and in the secure enclave, the portion of the content asset. The network device may encrypt, using the DRM key and in the secure enclave, the portion of the content asset. The network device may send, to a user device, the encrypted portion of the content asset before transferring another portion of the content asset to the secure enclave.

The network device may send, to a user device, the encrypted content asset. The user device may comprise at least one of a mobile phone, a set-top box, a laptop, a tablet, and/or an internet of things (IoT) device. The network device may send the encrypted content asset by streaming, to the user device, the encrypted content asset.

The network device may modify the content asset. The network device may encrypt the content asset by encrypting the modified content asset. The network device may modify the content asset by at least one of re-transcribing, re-packaging, augmenting, transcoding, adding secondary content, re-indexing, re-coding, and/or re-formatting at least a portion of the content asset.

At step 440, the DRM key may be sent. The DRM key may be sent based on the request. The DRM key may be sent to the network device. The license server 108 in FIG. 1 may send the DRM key to the network device 104 in FIG. 1. The license server 108 may send the DRM key based on the request. The DRM key may be encrypted using the shared secret key. The signed code module may cause the network device to store at least one of the shared secret key, the DRM key, and/or the decryption key in the secure enclave. The decryption key may be unique to the content asset.

A content distributor and/or rights holder may be associated with a content distribution network. The content distribution network may comprise a media storage device and a key server associated with the content distributor and/or rights holder. The media storage device may comprise a content asset. An owner of the content asset may wish to execute an indexing process to add a closed captioning component to the content asset.

The owner of the content asset may send a command to execute the indexing process to add the closed captioning component to the content asset to a network device associated with the owner of the media. The network device may be untrusted by the content distributor. The network device may comprise a secure enclave. The secure enclave may comprise enclave code. Based on verifying the enclave code, the key server associated with the content distributor may send keys needed to execute the indexing process to add the closed captioning component to the content asset to the network device.

The network device may use the keys to decrypt the content asset in the secure enclave. The network device may execute the indexing process to add the closed captioning component to the content asset in the secure enclave to generate a new version of the content asset. The network device may use the keys to encrypt the new version of the content asset in the secure enclave. The network device may send the new version of the content asset to the media storage device.

Figure 5:
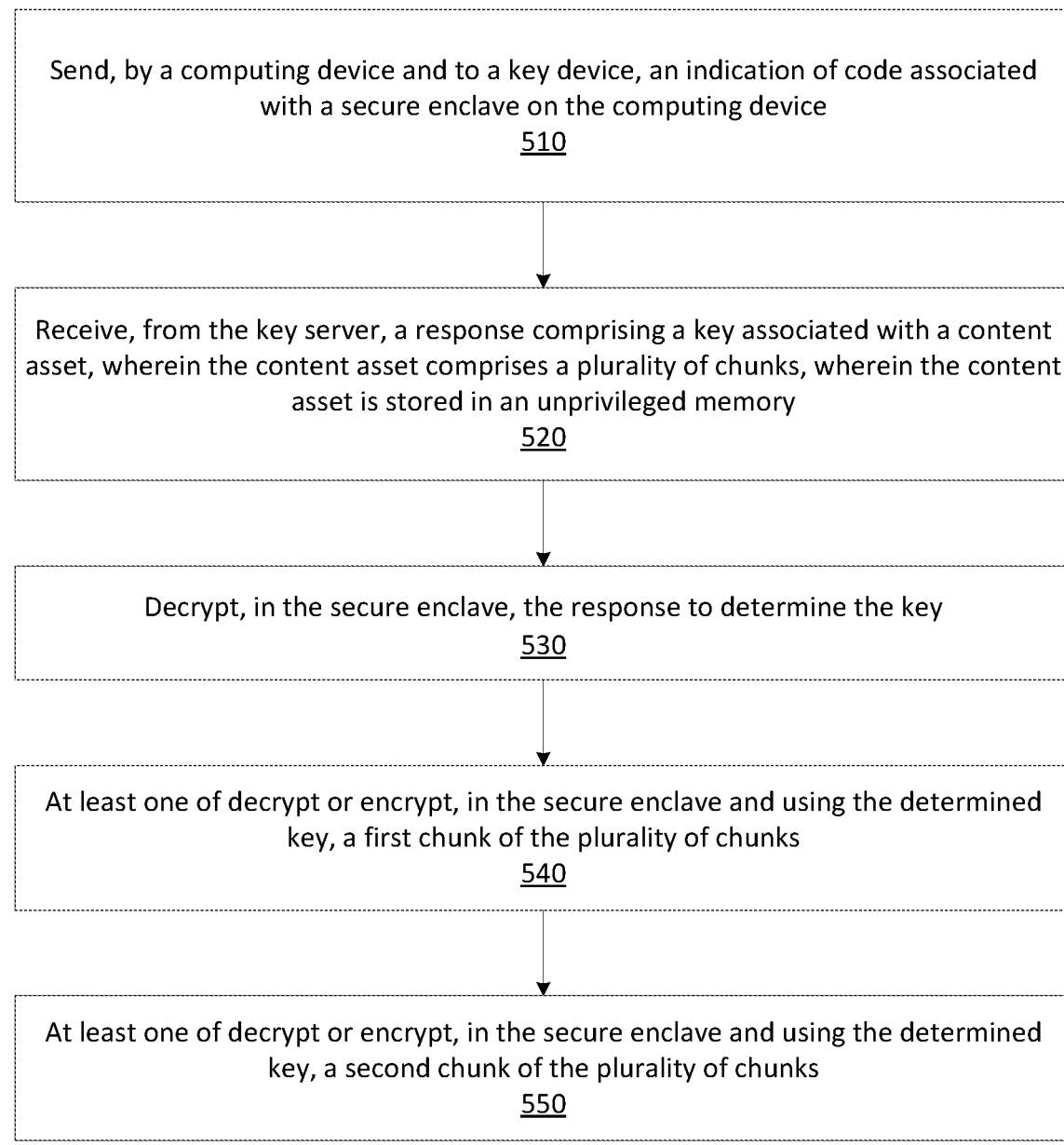
FIG. 5 shows an example method.

FIG. 5 shows an example method. At step 510, an indication of code associated with a secure enclave on a network device may be sent. The indication of the code may be sent by the network device. The indication of the code may be sent to a key device. The network device 104 in FIG. 1 may send the indication of code associated with the secure enclave on the network device 104 to the license server 108 in FIG. 1. The secure enclave may comprise a signed code module in a protected memory of the network device. A shared secret key may be received from the key device. The shared secret key may be received in response to sending the indication of the code associated with the secure enclave by the network device to the key device. A shared secret key may be received from the key device and in response to the sending the indication of the code. The network device 104 in FIG. 1 may receive the shared secret key from the license server 108 in FIG. 1 and in response to the sending the indication of the code. The indication may comprise a digital certificate associated with the network device.

The key device may comprise a key server. The network device may be untrusted by the key server. The key server may comprise a device associated with at least one of a content asset distributor, a digital services provider, and/or a content creator. The secure enclave may comprise an Intel Software Guard Extension (SGX) enclave. The indication of the code associated with the secure enclave may comprise an indication of an initial state of the signed code module. The indication of the initial state of the signed code module may comprise an indication of at least one of a state of a register of the secure enclave and/or a state of the protected memory. The indication of the code associated with the secure enclave may be encrypted with a key associated with the key server.

The key server may determine that the network device is a trusted device. The key server may determine that the network device is a trusted device by sending the indication of the code to an authentication device. The authentication device may determine, based on the indication of the code, that the secure enclave comprises a secure environment. The key server may send the shared secret key by initiating a handshake protocol with the network device. The shared secret key may comprise a pair of cryptographic keys. The shared secret key may comprise a pair of asymmetric keys. The network device may comprise a cloud computing device. The key server and the network device may be associated with different users. The network device may send the indication of the code associated with the secure enclave based on the signed code module being loaded in the protected memory. The network device may store the shared secret key in the secure enclave.

At step 520, a response comprising a key associated with a content asset may be received from the key device. The network device 104 in FIG. 1 may receive the response comprising the key associated with the content asset from the license server 108 in FIG. 1. The content asset may comprise a plurality of chunks. The content asset may be stored in an unprivileged memory. A request for the key associated with the content asset may be sent to the key device. The network device 104 in FIG. 1 may send the request for the key associated with the content asset to the license server 108 in FIG. 1. The request may be encrypted using the shared secret key. The key may comprise a decryption key. The key may comprise a digital rights management (DRM) key. The DRM key may be associated with a user device. A request for a DRM key may be sent based on receiving a request for the content asset.

The request for the DRM key associated with the content asset may be sent to the key server. The network device 104 in FIG. 1 may send the request for the DRM key associated with the content asset to the license server 108 in FIG. 1. The request may be encrypted using the shared secret key. An encrypted response to the request may be received from the key server. The network device 104 in FIG. 1 may receive an encrypted response to the request from the license server 108 in FIG. 1. The encrypted response may comprise the DRM key and a decryption key. The sending the request for the DRM key may be based on receiving a request for the content asset. The request may comprise a digital certificate associated with the network device.

The request for the DRM key may comprise an indication of the content asset. The DRM key may be associated with a user device. The request for the DRM key may comprise an indication of the user device. The request for the DRM key may comprise a digital certificate associated with the network device. The key server may be configured to send an encrypted response to the request based on the request being encrypted with the shared secret key.

The network device may receive the content asset. The network device may receive the content asset from a content distribution server. The network device may store the content asset external to the secure enclave. The network device may store the content asset in an unprivileged memory on the network device. The network device may transfer a portion of the content asset to the secure enclave.

At step 530, the response may be decrypted. The response may be decrypted in the secure enclave. The response may be decrypted to determine the key. The network device 104 in FIG. 1 may decrypt the response to determine the key in the secure enclave. The encrypted response may be decrypted in the secure enclave and using the shared secret key to determine the DRM key and the decryption key. The network device 104 in FIG. 1 may decrypt the encrypted response in the secure enclave to determine the DRM key and the decryption key using the shared secret key.

At step 540, a first chunk of the plurality of chunks may be at least one of decrypted and/or encrypted. The first chunk may be decrypted and/or encrypted in the secure enclave. The first chunk may be decrypted and/or encrypted using the determined key. The network device 104 in FIG. 1 may decrypt and/or encrypt the first chunk of the plurality of chunks in the secure enclave and using the determined key.

At step 550, a second chunk of the plurality of chunks may be at least one of decrypted and/or encrypted. The second chunk may be decrypted and/or encrypted in the secure enclave. The second chunk may be decrypted and/or encrypted using the determined key. The network device 104 in FIG. 1 may decrypt and/or encrypt the second chunk of the plurality of chunks in the secure enclave and using the determined key. The decrypting and/or encrypting the second chunk may be based on sending, to a user device, the first chunk.

A content distributor and/or rights holder may be associated with a content distribution network. The content distribution network may comprise a media storage device. The media storage device may comprise a content asset. The content asset may comprise a plurality of chunks. The content asset may comprise an audio component. The audio component may comprise a first language, such as English. An owner of the content asset may wish to add a second audio component to the content asset. The second audio component may comprise a second language, such as Spanish.

The owner of the content asset may send a command to add the second audio component to the content asset to a network device associated with the owner of the content asset. The network device may be untrusted by the content distributor. The network device may comprise a secure enclave. The secure enclave may comprise enclave code. Based on verifying the enclave code, a key server associated with the content distributor may send keys needed to add the second audio component to the content asset to the network device.

The network device may use the keys to decrypt a first chunk of the content asset in the secure enclave. The network device may add the second component to the first chunk of the content asset in the secure enclave to generate a new version of the first chunk of the content asset. The network device may use the keys to encrypt the new version of the first chunk of the content asset in the secure enclave. The network device may use the keys to decrypt a second chunk of the content asset in the secure enclave. The network device may add the second component to the second chunk of the content asset in the secure enclave to generate a new version of the second chunk of the content asset. The network device may use the keys to encrypt the new version of the second chunk of the content asset in the secure enclave.

Figure 6:
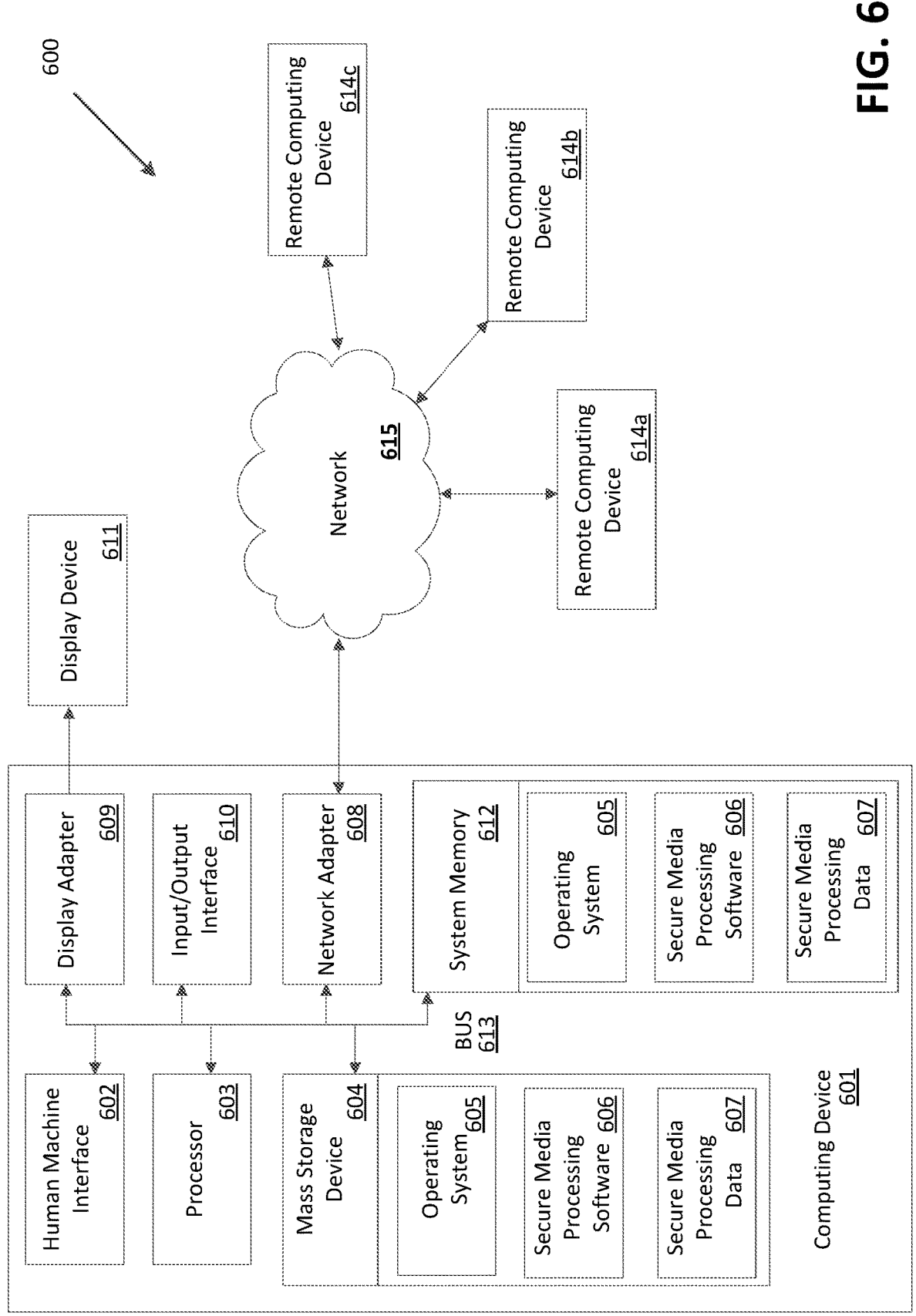
FIG. 6 shows an example computing environment.

FIG. 6 shows an example computing environment 600. The computing environment 600 may perform the disclosed methods. This example computing environment is only an example of a computing environment and is not intended to suggest any limitation as to the scope of use and/or functionality of computing environment architecture. Neither should the computing environment be interpreted as having any dependency and/or requirement relating to any one and/or combination of components shown in the example computing environment.

The present methods and systems may be operational with numerous other general purpose and/or special purpose computing system environments and/or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems and/or devices, and the like.

The processing of the disclosed methods and systems may be performed by software components. The disclosed systems and methods may be described in the general context of computer-executable instructions, such as program modules, being executed by one and/or more computers and/or other devices. Generally, program modules comprise computer code, routines, programs, objects, components, data structures, etc. that performs tasks and/or implement abstract data types. The disclosed methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods disclosed herein may be implemented via a general-purpose computing device in the form of a computing device 601. The components of the computing device 601 may comprise, but are not limited to, one and/or more processors and/or processing units 603, a system memory 612, and a system bus 613 that couples various system components including the processor 603 to the system memory 612. In the case of multiple processing units 603, the system may utilize parallel computing.

The system bus 613 represents one and/or more of several possible types of bus structures, including a memory bus and/or memory controller, a peripheral bus, an accelerated graphics port, and a processor and/or local bus using any of a variety of bus architectures. For example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description may also be implemented over a wired and/or wireless network connection and each of the subsystems, including the processor 603, a mass storage device 604, an operating system 605, secure media processing software 606, secure media processing data 607, a network adapter 608, system memory 612, an Input/Output Interface 610, a display adapter 609, a display device 611, and a human machine interface 602, may be contained within one and/or more remote computing devices 614a,b,c at physically separate locations, connected through buses of this form, in effect implementing a fully distributed system.

The computing device 601 typically comprises a variety of computer readable media. Exemplary readable media may be any available media that is accessible by the computing device 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as secure media processing data 607 and/or program modules such as operating system 605 and secure media processing software 606 that are immediately accessible to and/or are presently operated on by the processing unit 603.

The computing device 601 may comprise other removable/non-removable, volatile/non-volatile computer storage media. For example, FIG. 6 shows a mass storage device 604 which may provide non-volatile storage of computer code, computer readable instructions, data structures, program modules, and other data for the computing device 601. For example and not meant to be limiting, a mass storage device 604 may be a hard disk, a removable magnetic disk, a removable optical disk, magnetic cassettes and/or other magnetic storage devices, flash memory cards, CD-ROM, digital versatile disks (DVD) and/or other optical storage, random access memories (RAM), read only memories (ROM), electrically erasable programmable read-only memory (EEPROM), and the like.

Optionally, any number of program modules may be stored on the mass storage device 604, such as an operating system 605 and secure media processing software 606. Each of the operating system 605 and secure media processing software 606 (and/or some combination thereof) may comprise elements of the programming and the secure media processing software 606. Secure media processing data 607 may also be stored on the mass storage device 604. Secure media processing data 607 may be stored in any of one and/or more databases known in the art. Examples of such databases comprise, DB2®, Microsoft® Access, Microsoft® SQL Server, Oracle®, mySQL, PostgreSQL, and the like. The databases may be centralized and/or distributed across multiple systems.

The user may enter commands and information into the computing device 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices may be connected to the processing unit 603 via a human machine interface 602 that is coupled to the system bus 613, but may be connected by other interface and bus structures, such as a parallel port, game port, an IEEE 1394 Port (also known as a Firewire port), a serial port, and/or a universal serial bus (USB).

A display device 611 may also be connected to the system bus 613 via an interface, such as a display adapter 609. It is contemplated that the computing device 1301 may have more than one display adapter 609 and the computing device 601 may have more than one display device 611. For example, a display device may be a monitor, an LCD (Liquid Crystal Display), and/or a projector. In addition to the display device 611, other output peripheral devices may comprise components such as speakers (not shown) and a printer (not shown) which may be connected to the computing device 601 via Input/Output Interface 1310. Any step and/or result of the methods may be output in any form to an output device. Such output may be any form of visual representation, including, but not limited to, textual, graphical, animation, audio, tactile, and the like. The display 611 and computing device 601 may be part of one device, and/or separate devices.

The computing device 601 may operate in a networked environment using logical connections to one and/or more remote computing devices 614a,b,c. For example, a remote computing device may be a personal computer, portable computer, a smart phone, a server, a router, a network computer, a peer device and/or other common network node, and so on. Logical connections between the computing device 601 and a remote computing device 614a,b,c may be made via a network 615, such as a local area network (LAN) and a general wide area network (WAN). Such network connections may be through a network adapter 608. A network adapter 608 may be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are shown herein as discrete blocks, although it is recognized that such programs and components reside at various times in different storage components of the computing device 601 and are executed by the data processor(s) of the computer. An implementation of secure media processing software 606 may be stored on and/or sent across some form of computer readable media. Any of the disclosed methods may be performed by computer readable instructions embodied on computer readable media. Computer readable media may be any available media that may be accessed by a computer. For example and not meant to be limiting, computer readable media may comprise "computer storage media" and "communications media." "Computer storage media" comprise volatile and non-volatile, removable and non-removable media implemented in any methods and/or technology for storage of information such as computer readable instructions, data structures, program modules, and/or other data. Exemplary computer storage media comprises, but is not limited to, RAM, ROM, EEPROM, flash memory and/or other memory technology, CD-ROM, digital versatile disks (DVD) and/or other optical storage, magnetic cassettes, magnetic tape, magnetic disk storage and/or other magnetic storage devices, and/or any other medium which may be used to store the desired information and which may be accessed by a computer.

What is claimed:

1. A method comprising:
   sending, to a key server and by a device during a time in which the device is not authenticated, an indication of a secure enclave on the device;
   receiving, based on sending the indication of the secure enclave and from the key server, a shared secret key;
   sending, to the key server, a request for a digital rights management (DRM) key associated with a content asset;
   based on the request, receiving, from the key server, at least the DRM key, wherein the at least the DRM key is encrypted using the shared secret key; and
   decrypting, using the secure enclave and the shared secret key, the at least the DRM key.

2. The method of claim 1, further comprising encrypting, using the secure enclave and the DRM key, the content asset.

3. The method of claim 2, further comprising sending, to a user device, the encrypted content asset.

4. The method of claim 2, further comprising:
   storing a first portion of the content asset in the secure enclave; and
   decrypting, using the DRM key, the first portion of the content asset.

5. The method of claim 4, further comprising:
   encrypting, using the DRM key, the first portion of the content asset; and
   sending, to a user device, the encrypted first portion of the content asset.

6. The method of claim 4, further comprising:
   storing the first portion external to the secure enclave;
   storing a second portion of the content asset in the secure enclave; and
   decrypting the second portion of the content asset.

7. The method of claim 1, wherein the method further comprises:
   modifying the content asset; and
   encrypting the modified content asset.

8. A device comprising:
   one or more processors; and
   memory storing instructions that, when executed by the one or more processors, cause the device to:
   send, to a key server during a time in which the device is not authenticated, an indication of a secure enclave on the device;
   receive, based on sending the indication of the secure enclave and from the key server, a shared secret key;
   send, to the key server, a request for a digital rights management (DRM) key associated with a content asset;
   based on the request, receive, from the key server, at least the DRM key, wherein the at least the DRM key is encrypted using the shared secret key; and
   decrypt, using the secure enclave and the shared secret key, the at least the DRM key.

9. The device of claim 8, wherein the instructions, when executed by the one or more processors, further cause the device to encrypt, using the secure enclave and the DRM key, the content asset.

10. The device of claim 9, wherein the instructions, when executed by the one or more processors, further cause the device to send, to a user device, the encrypted content asset.

11. The device of claim 9, wherein the instructions, when executed by the one or more processors, further cause the device to:
    store a first portion of the content asset in the secure enclave; and
    decrypt, using the DRM key, the first portion of the content asset.

12. The device of claim 11, wherein the instructions, when executed by the one or more processors, further cause the device to:
    encrypt, using the DRM key, the first portion of the content asset; and
    send, to a user device, the encrypted first portion of the content asset.

13. The device of claim 11, wherein the instructions, when executed by the one or more processors, further cause the device to:
    store the first portion external to the secure enclave;
    store a second portion of the content asset in the secure enclave; and
    decrypt the second portion of the content asset.

14. The device of claim 8, wherein the instructions, when executed by the one or more processors, further cause the device to:
    modify the content asset; and
    encrypt the modified content asset.

15. A non-transitory computer-readable medium storing instructions that, when executed, cause:
    sending, to a key server and by a device during a time in which the device is not authenticated, an indication of a secure enclave on the network device;
    receiving, based on sending the indication of the secure enclave and from the key server, a shared secret key;
    sending, to the key server, a request for a digital rights management (DRM) key associated with a content asset;
    based on the request, receiving, from the key server, at least the DRM key, wherein the at least the DRM key is encrypted using the shared secret key; and
    decrypting, using the secure enclave and the shared secret key, the at least the DRM key.

16. The non-transitory computer-readable medium of claim 15, wherein the instructions, when executed, further cause encrypting, using the secure enclave and the DRM key, the content asset.

17. The non-transitory computer-readable medium of claim 16, wherein the instructions, when executed, further cause sending, to a user device, the encrypted content asset.

18. The non-transitory computer-readable medium of claim 16, wherein the instructions, when executed, further cause:
    storing a first portion of the content asset in the secure enclave; and
    decrypting, using the DRM key, the first portion of the content asset.

19. The non-transitory computer-readable medium of claim 18, wherein the instructions, when executed, further cause:
    encrypting, using the DRM key, the first portion of the content asset; and
    sending, to a user device, the encrypted first portion of the content asset.

20. The non-transitory computer-readable medium of claim 18, wherein the instructions, when executed, further cause:
    storing the first portion external to the secure enclave;
    storing a second portion of the content asset in the secure enclave; and
    decrypting the second portion of the content asset.

21. The non-transitory computer-readable medium of claim 15, wherein the instructions, when executed, further cause:
    modifying the content asset; and
    encrypting the modified content asset.

22. A system comprising:
    a key server; and
    a device comprising a secure enclave, wherein the device is configured to:
    send, to the key server during a time in which the device is not authenticated, an indication of the secure enclave on the network device;
    receive, based on sending the indication of the secure enclave and from the key server, a shared secret key;
    send, to the key server, a request for a digital rights management (DRM) key associated with a content asset;
    based on the request, receive, from the key server, at least the DRM key, wherein the at least the DRM key is encrypted using the shared secret key; and
    decrypt, using the secure enclave and the shared secret key, the at least the DRM key.

23. The system of claim 22, wherein the device is further configured to encrypt, using the secure enclave and the DRM key, the content asset.

24. The system of claim 23, wherein the device is further configured to send, to a user device, the encrypted content asset.

25. The system of claim 23, wherein the device is configured to decrypt the content asset, by:

storing a first portion of the content asset in the secure enclave; and decrypting, using the DRM key, the first portion of the content asset.

26. The system of claim 25, wherein the device is further configured to:

encrypt, using the DRM key, the first portion of the content asset; and send, to a user device, the encrypted first portion of the content asset.

27. The system of claim 25, wherein the device is configured to decrypt the content asset, by:

storing the first portion external to the secure enclave;

storing a second portion of the content asset in the secure enclave; and decrypting the second portion of the content asset.

28. The system of claim 22, wherein the device is further configured to:

modify the content asset; and encrypt the modified content asset.

\* \* \* \* \*